United States Patent [19]

Leone et al.

[11] Patent Number: 5,793,909

[45] Date of Patent: Aug. 11, 1998

[54] OPTICAL MONITORING AND TEST ACCESS MODULE

[75] Inventors: Frank Salvatore Leone, Berkeley Heights, N.J.; Joel Leslie Mock, Norcross; John Mark Palmquist, Lilburn, both of Ga.; William Joseph Parzygnat, Morris Township, Morris County, N.J.; Richard Joseph Pimpinella, Hampton, N.J.; Randy Alan Reagan, Morris Plains, N.J.

[73] Assignee: Lucent Technologies Inc., Murray Hill, N.J.

[21] Appl. No.: 709,977

[22] Filed: Sep. 9, 1996

[51] Int. Cl.$^6$ ............................................. C02B 6/36
[52] U.S. Cl. ........................... 385/24; 385/134; 385/135
[58] Field of Search ............................ 359/127, 136, 359/110; 385/24, 134, 135

[56] References Cited

U.S. PATENT DOCUMENTS

| | | | |
|---|---|---|---|
| 5,069,521 | 12/1991 | Hardwick | 385/24 |
| 5,204,925 | 4/1993 | Bonanni et al. | 385/89 |
| 5,218,465 | 6/1993 | Lebby et al. | 359/110 |
| 5,448,675 | 9/1995 | Leone et al. | 385/135 |
| 5,461,693 | 10/1995 | Pimpinella | 385/135 |
| 5,570,217 | 10/1996 | Fleuren | 359/110 |

Primary Examiner—John Ngo
Attorney, Agent, or Firm—Claude R. Narcisse

[57] ABSTRACT

The present invention is an optical monitoring and test access interconnection module especially adapted for use with a fiber optic distribution frame for a fiber optic communications system. The interconnection module provides a combination of monitoring and test access for two fiber lines, typically a transmit/receive pair, where wavelength division multiplexer (WDM) test access is provided to both the transmit and receive fibers. In one embodiment of the present invention, the interconnection module monitors only the receive fiber line where a power monitoring circuit receives a monitor level optical signal via an optical tap and converts the optical signal to an electrical output. Processing electronics and firmware within the module are operable to generate alarms and other control signals when changes in the power level of the received signal are detected. A test access path is provided on the module for use, for example, with an optical time domain reflectometer (OTDR). In one embodiment of the present invention, the interconnection module incorporates a unique physical design arrangement that separates the optical signal processing from the electronic processing into partitioned sub-modules. The optical and electronic sub-modules may advantageously be assembled (and dis-assembled) by means of guides that allow the module halves to slide together. A unique optical mating connector is provided in the sliding arrangement to join the optical module to an opto-electronic photodetector in the electronic module.

25 Claims, 5 Drawing Sheets

OPTICAL MONITORING AND TEST ACCESS MODULE

RELATED APPLICATIONS

The present patent application is related to U.S. patent application Ser. No. 08/645,108, entitled AN OPTICAL COMMUNICATIONS SYSTEM HAVING DISTRIBUTED INTELLIGENCE, U.S. patent application Ser. No. 08/709,978, entitled FIBER OPTIC OPERATION CENTER, filed Sep. 9, 1996; and U.S. patent application Ser. No. 08/713,516 entitled OPTICAL FIBER DISTRIBUTION SHELF ASSEMBLY CONTAINING A MODULAR OPTICAL SWITCH those applications having at least one common inventor and common assignee and being incorporated herein by reference.

FIELD OF THE INVENTION

The present invention relates generally to the field of fiber communications systems, and more particularly to interconnection modules which relate to the monitoring and maintenance of inter-connected optical fibers within a communications system.

BACKGROUND OF THE INVENTION

In optical fiber communications systems, optical fiber distribution frames or lightguide cross-connect (LGX) frames are used for optical coupling within the communications system, e.g., for coupling optical fibers from an outside environment entering a customer's premises, for example, a central switching office, to internal fibers for equipment on the customer's premises. A typical distribution frame, such as, the LGX® fiber administration system which is currently manufactured by Lucent Technologies of Murray Hill, N.J., the assignee herein, houses a multiplicity of shelves, each shelf including one or more optical coupling or interconnection modules in which the ends of incoming fibers and/or outgoing internal optical fibers are adapted for interconnection therebetween by appropriate connectors. For example, the incoming and outgoing optical fibers are connected to respective coupling modules, and a corresponding plurality of optical cross-connect jumper cables (i.e., patch cords) optically connect the incoming optical fibers from one coupling module to the desired outgoing optical fibers from the appropriate coupling module. Alternately, the incoming and outgoing fibers are terminated at different locations within the same distribution frame and cross-connect jumpers optically connect the appropriate fibers from one location to another.

Within these optical distribution frames, testing the integrity and quality of the lines and/or connections therebetween often is performed manually, making it a difficult, cumbersome, costly and labor-intensive undertaking. It is known in the prior art to launch test signals over fiber optic lines whose operating condition is in question to thereby determine the condition of those fibers. However, this determination is performed manually, and typically in reaction to a system malfunction rather than an alert from a continuous monitoring system. Moreover, these coupling modules are typically not well-suited for interconnection with test equipment that can continually monitor the integrity of the fiber optic lines and/or connections, for example, due to the lack of availability of readily accessible test access ports. Accordingly, there is a need for a coupling module that is particularly well adapted for use in fiber distribution frames where fiber optic lines and/or connections are desired to be continually monitored.

SUMMARY OF THE INVENTION

The present invention is an optical monitoring and test access interconnection module especially adapted for use with a fiber optic distribution frame for a fiber optic communications system. The interconnection module provides a combination of monitoring and test access for two fiber lines, typically a transmit/receive pair, where wavelength division multiplexer (WDM) test access is provided to both the transmit and receive fibers. In one embodiment of the present invention, the interconnection module monitors only the receive fiber line where a power monitoring circuit receives a monitor level optical signal via an optical tap and converts the optical signal to an electrical output. Processing electronics and firmware within the module are operable to generate alarms and other control signals when changes in the power level of the received signal reach specified levels. A test access path is provided on the module for use, for example, with an optical time domain reflectometer (OTDR). This provides the capability to automatically locate the cause of a disturbance, for example, by launching a test signal through the module at a wavelength different from the transmission signal wavelength so that the transmission is undisturbed.

In one embodiment of the present invention, the interconnection module incorporates a unique physical design arrangement that separates the optical signal processing from the electronic processing into partitioned sub-modules. The optical and electronic sub-modules may advantageously be assembled (and dis-assembled) by means of guides that allow the module halves to slide together. A unique optical mating connector is provided in the sliding arrangement to join the optical module to an optoelectronic photodetector in the electronic module.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Although the optical monitoring and test access interconnection module as described can be used on any prior art fiber administration system that uses standard sized fiber distribution shelves, the interconnection module is preferably used in a fiber administration system with distributed intelligence, such as that described in U.S. patent application Ser. No. 08/645,108 entitled AN OPTICAL COMMUNICATIONS SYSTEM HAVING DISTRIBUTED INTELLIGENCE, filed May 13, 1996 and U.S. patent application Ser. No. 08/709,978 entitled FIBER OPTIC OPERATION CENTER, filed Sep. 9, 1996, both of which having previously incorporated by reference. In the following description, similar components are referred to by the same reference numeral in order to simplify the sequential aspect of the drawings.

Figure 1:
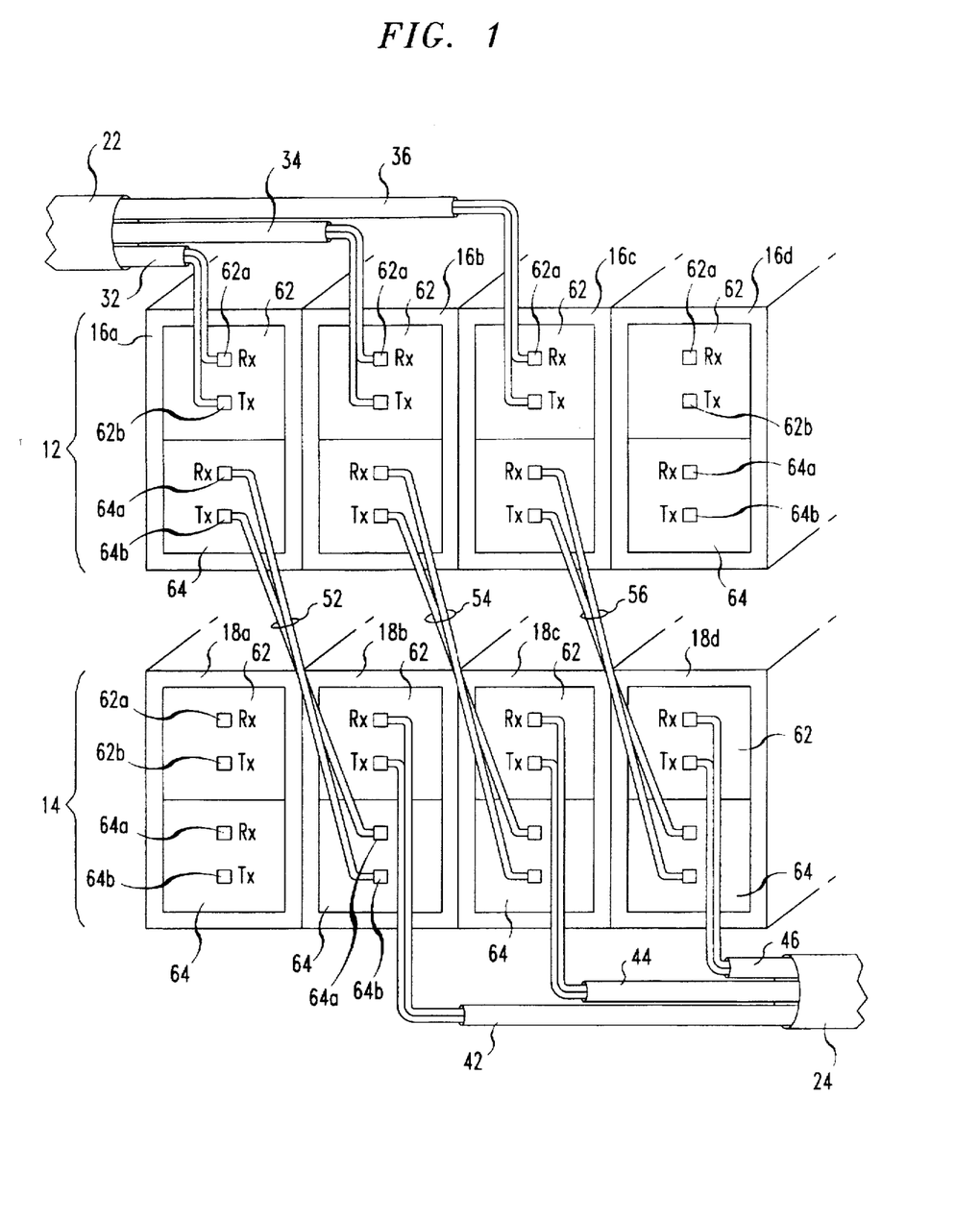
FIG. 1 is a schematic diagram of a conventional distribution frame used in an optical communications system.

Referring to FIG. 1, a schematic diagram of an optical fiber distribution frame 10 is shown. Conventional communications systems use such a distribution frame alone or in combination with other distribution frames to provide optical communications throughout an area of interest. Distribution frame 10 includes at least one shelf (e.g., shelves 12 and 14) with one or more interconnection modules installed within available slots on each shelf. For example, interconnection modules 16a, 16b, 16c and 16d are mounted or otherwise operably installed within shelf 12 and interconnection modules 18a, 18b, 18c and 18d are mounted within shelf 14. Although each module shown here and described below occupies a single shelf slot and is capable of handling a single optical channel, it would be understood that distribution frame 10 also is suitable for use with existing modules that, e.g., occupy two (2) or more shelf slots yet have three (3) or more optical channels.

As shown, the interconnection modules are used to optically cross-connect optical channels, e.g., from a first optical cable 22 to a second optical cable 24. As shown in FIG. 1, a plurality of first optical channels 32, 34 and 36, each having a transmit fiber and a receive fiber, are optically connected to interconnection modules 16a, 16b and 16c, respectively. Similarly, a plurality of second optical channels 42, 44 and 46 are optically connected to interconnection modules 18b, 18c and 18d, respectively. Corresponding pairs of jumper fibers or optical cross-connects (shown as 52, 54 and 56) interconnect first optical channels with the desired second optical channels.

Although the interconnection modules being cross-connected are shown installed within adjacent shelves 12, 14, it is understood that the interconnection modules being cross-connected are capable of being located in different physical areas (e.g., different bays) of the same distribution frame, or even different distribution frames within the same optical communications system. The physical distance between cross-connected interconnection modules are limited, e.g., by the practical length of cross-connect jumpers used therebetween.

In a conventional optical communications system arrangement, distribution frame 10 is housed within or in close proximity to a facility of interest, e.g., a customer's premises. In FIG. 1, first optical cable 22 represents, e.g., a plurality of incoming optical channels entering the facility (often referred to as "OSP" or "outside plant" cable). Correspondingly, second optical channel 24 represents a plurality of optical channels for equipment or other uses within the facility (often referred to as "equipment" cable).

In this example, interconnection module 16a in shelf 12 is shown in optical connection with interconnection module 18b in shelf 14 via jumper fiber pair 52. Each interconnection module has a first jack pair 62 (e.g., a receive or Rx jack 62a and a transmit or Tx jack 62b) or other connector port device used for connecting a transmit and receive line typically used for connection with an optical channel and a second pair of jacks 64a and 64b, typically for connection with a cross-connect jumper pair, as shown.

Alternatively, a single interconnection module directly couples a first optical channel to a second optical channel. That is, a first optical channel is operably connected to the first jack pair 62 of a desired interconnection module and a second optical channel is operably connected to the second jack pair 64 of the same interconnection module.

Typically, interconnection module jacks are adapted for optically coupling various types of optical fibers. For example, each interconnection module is configured, e.g., so that the Tx jack of one such pair is optically coupled to the Rx jack of the other jack pair. In this manner, consistency is maintained throughout distribution frame 10 with respect to the connections that subsequently are made to the interconnection modules.

For example, in FIG. 1, first optical channel 32 has a transmit fiber shown optically connected to Rx jack 62a and a receive fiber shown optically connected to Tx jack 62b of interconnection module 16a on shelf 12. Similarly, with respect to second optical channel 42 from second optical cable 24, a transmit fiber is shown optically connected to Rx jack 62a (of interconnection module 18b) and a receive fiber is shown optically connected to Tx jack 62b (of interconnection module 18b). Accordingly, with respect to the cross-connections made between interconnection modules 16a and 18b, each Tx jack 64b is connected to the Rx jack 64a of the cross-connected interconnection module. That is, Rx jack 64a of interconnection module 16a is optically cross-coupled to Tx jack 64b of interconnection module 18b, and Tx jack 64b of interconnection module 16a is optically cross-coupled to Rx jack 64a of interconnection module 18b.

Therefore, in conventional operation, an optical signal that is assumed to begin from the transmit fiber of first optical channel 32 is transmitted to Rx jack 62a of interconnection module 16a, out of Tx jack 64b of interconnection module 16a, through the appropriate cross-connect fiber of jumper pair 52 to Rx jack 64a of interconnection module 18b, out of Tx jack 62b of interconnection module 18b, and to the receive fiber of second optical channel 42. From the transmit fiber of second optical channel 42, optical information is transmitted to Rx jack 62a of interconnection module 18b, out of Tx jack 64b of interconnection module 18b, through the appropriate cross-connect fiber of jumper pair 52 to Rx jack 64a of interconnection module 16a, out of Tx jack 62b of interconnection module 16a, and to the receive fiber of first optical channel 32.

Within conventional distribution frames, functions such as testing and monitoring often are performed manually or automatically by connecting necessary instrumentation in series between each set of optically coupled interconnection modules. In this manner, each pair of optical cross-connect jumpers is replaced by (i) a pair of optical fibers routed from the first of two interconnection modules (e.g., from second jack pair 64a–b) to the necessary testing/monitoring instrumentation and (ii) a pair of optical fibers routed from the instrumentation to the second interconnection module. In this conventional arrangement, the testing/monitoring instrumentation is installed similarly to existing interconnection modules (e.g., on shelves) near the interconnection module shelves, if sufficient space exists. However, conventional testing/monitoring instrumentation is not located wholly or partially within any of the interconnection modules.

Compared to conventional arrangements, the present invention discloses and makes use of an interconnection module configuration that allows for controllers, microcontrollers and other "intelligence" or "intelligent devices" to be distributed conveniently throughout the distribution frames rather than having a plurality of passive modules in a given distribution frame routed to and from an individual testing/ monitoring location. Alternatively, the interconnection module configuration of the present invention is used with an inventive interconnection fabric arrangement having intelligence distributed throughout the fabric arrangement and that facilitates use of this distributed intelligence.

For purposes of discussion in this description, the terms "intelligent devices" and "distributed intelligence" in this context are intended to encompass any active mechanical, electronic, optical and electro-optic components, including circuitry, microcontrollers and microprocessors, that contribute to those functions that are at least partially performed within the inventive interconnection module for the purpose of determining "identifiable operating characteristics". For purposes of discussion in this description, the term "identifiable operating characteristics" is intended to include the overall operability or an otherwise qualitative condition of the optical fibers, connectors and/or connections used within the optical communications system of interest. Such functions include testing, monitoring, reading, decoding, analyzing and the like.

Figure 2:
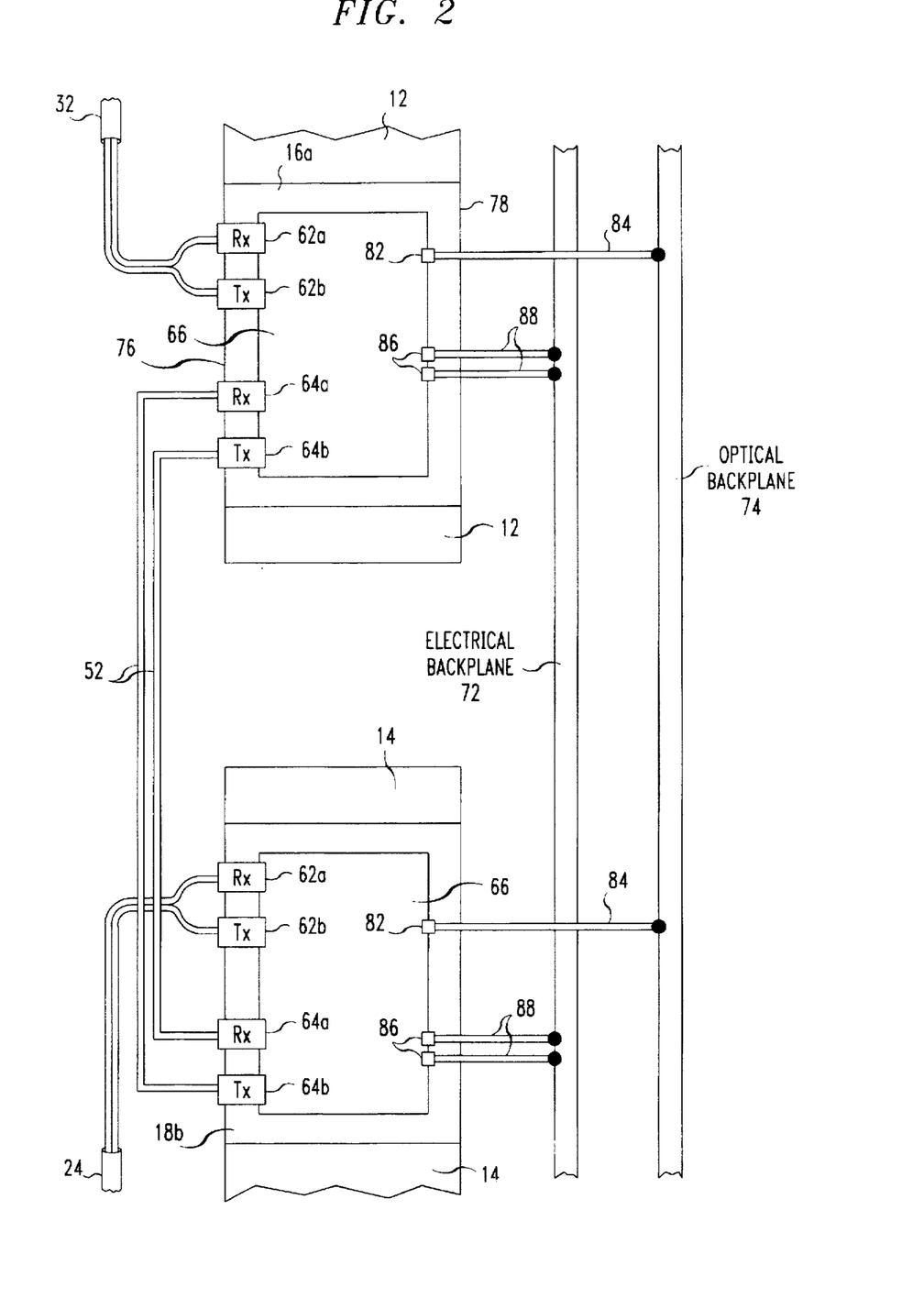
FIG. 2 is a side schematic diagram of an illustrative portion of a distribution frame used in an optical communications system according to an embodiment of the present invention.

As shown in FIG. 2, one or more inventive interconnection modules, e.g., 16a and 18b, are installed within shelves 12, 14, respectively, of distribution frame 10 and interconnected via jumper pair 52. Inventive interconnection modules 16a, 18b include a distributed intelligence arrangement (shown generally as 66) coupled to their first (62) and/or second (64) jack pairs. The arrangement enables operable connection with an electrical interconnection fabric (shown as 72) and an optical interconnection fabric (shown as 74) in addition to the conventional optical cross-connection between optical channel 32 and optical channel 42. Interconnection modules including distributed intelligence are interchangeable with conventional interconnection modules and, except for their distributed intelligence arrangement, have conventional structure.

Interconnection modules having distributed intelligence include a front face 76 having conventional jacks for optical cross-connection. Also, the inventive interconnection modules each have a rear face 78 for operable connection to interconnection fabrics 72, 74. For example, at least one optical jack 82 is adapted for optical connection to optical interconnection fabric 74 via an optical fiber coupling 84 and at least one pair of electrical connectors 86 is adapted for electrical connection of at least the distributed intelligence portion 66 of the interconnection modules to electrical interconnection fabric 72 via wires 88.

In this inventive arrangement, interconnection modules within a shelf are adapted to be electrically coupled to a corresponding backplane arrangement or shelf controller interface (SCI) bus 91 which is electrically coupled to a corresponding shelf controller or shelf controller module (SCM) 92. Shelf controllers within a bay (e.g., a group of shelves) are electrically coupled via an interconnection bus 94 (e.g., a local area network or LAN bus) to a corresponding bay controller 95 (shown in FIG. 3). Likewise, bay controllers are electrically coupled to controller 90 through said interconnection bus 94. Shelf controllers 92 and bay controllers 95 typically take the form of interconnection modules or backplane arrangements and thus, in actual practice, are installed, e.g., within spare locations in existing shelves.

Optical connection between interconnection modules and controller 90 is similar. A plurality of optical switches function as controllers at the shelf, bay and system levels in a similar cascading scheme. For example, each shelf has an optical switch 102 for optically coupling thereto the interconnection modules within that shelf. Also, shelf controlling optical switches 102 are optically coupled to an optical switch 104 corresponding to the bay within which the shelf is located. Each bay controlling optical switch 104 is optically coupled to a system optical switch 106 for optical connection to controller 90. Depending on the optical system arrangement, controller 90 can be a frame controller providing a gateway between interconnection bus 94 and the next higher network level.

Figure 3:
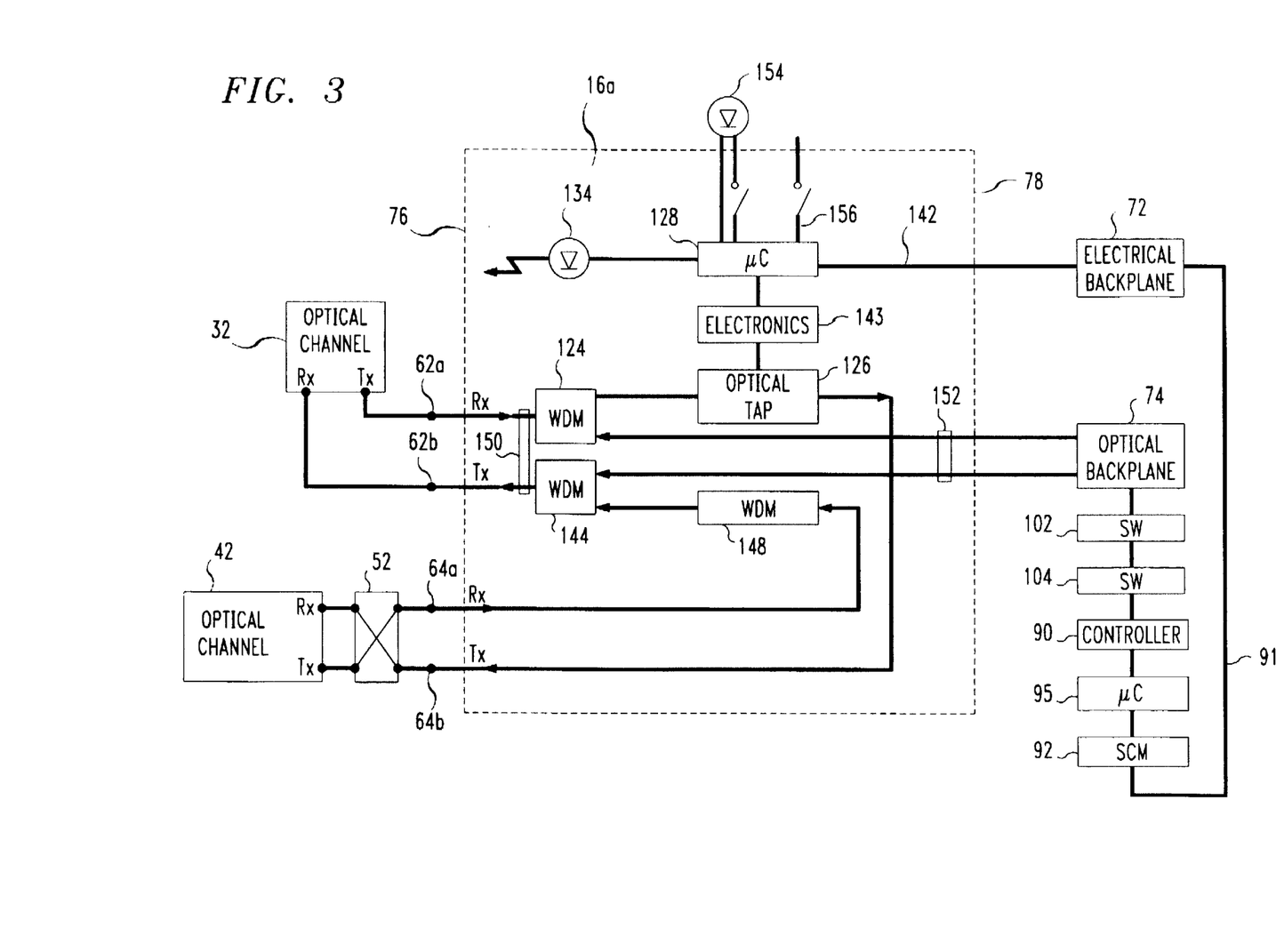
FIG. 3 is a schematic diagram of an interconnection module according to an embodiment of the invention.

Referring to FIG. 3, an interconnection module according to an embodiment of the invention is shown. Inventive interconnection module 16a has a plurality of input jacks 62a, 62b, 64a, 64b on front face 76 that are consistent with the input jacks of conventional interconnection modules, thus contributing to the interchangeability of interconnection module 16a with conventional interconnection modules. Such interchangeability is a significant feature of the inventive interconnection module.

Interconnection module 16a includes a first wavelength division multiplexer (WDM) 124 with an input optically coupled to Rx jack 62a and an output optically coupled to an optical tap 126. One output of optical tap 126 is optically coupled to Tx jack 64b and the other output is coupled to a microcontroller 128 or other suitable device for interpreting the information collected by optical tap 126. For example, microcontroller 128 may have a light detecting component such as a photodiode (not shown) that converts the light coupled from optical tap 126 to an electrical signal used internally by microcontroller 128 or by an external passive device such as an LED 134 coupled to microcontroller 128. Alternatively, microcontroller 128 may have receiving components capable of interpreting the optical information coupled from optical tap 126. As shown in FIG. 3, the microcontroller 128 is coupled to optical 126 by means of electronics 143 suitable for converting optical power to a corresponding electrical signal, as would be understood by a person skilled in the art. Also, microcontroller 128 is electrically connected to electrical interconnection fabric 72 via an electrical coupling 142.

Figure 4:
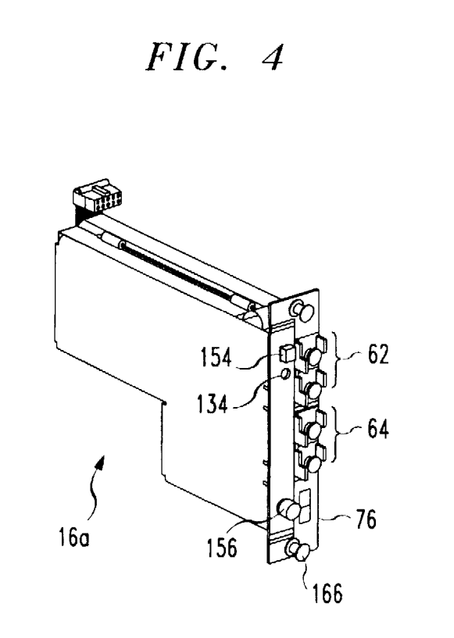
FIG. 4 is a perspective view illustrating the physical design of one exemplary embodiment of the present invention.

Tx jack 62b is optically coupled to the output of a second WDM 144 (the primary direction of optical transmission is depicted in FIG. 4 by arrows). The first of two inputs of second WDM 144 is optically coupled to optical interconnection fabric 74 and the second input is optically coupled to the output of a third WDM 148. The input of third WDM 148 is optically coupled to Rx jack 64a. Alternatively, WDM 144 and/or WDM 148 are suitable for an optical tap (not shown) to be coupled therewith, where an output of the optical tap would be coupled to the microcontroller 128 or alternately an additional microcontroller for monitoring the optical channel received on Rx jack 64a. Such a connection from Rx jack 64a is typically made from equipment within the customer premises, however. In addition, it would be understood that the WDM 144 and WDM 148 may be combined into a single unit.

Optical filters may also be coupled at any of the interconnections to the jack pairs, including the interconnection to the optical backplane at test ports, to thereby provide isolation protection for the interconnection module and other equipment coupled within the signal path. In one embodiment, the isolation filters 150, 152 are coupled to the (OSP) jack pairs and the test ports 160. An LED test button or switch 154 is also coupled to the microcontroller 128 which when activated provides a communication test to the shelf controller module 92. The LED within the test button 154 acts as an indicator for a variety of functions, such as, fiber tracing or patching. Another push-button (switch) 156 may be activated in order to place the microcontroller 128 of an individual interconnection module into a self-test diagnostic mode. LED 134 acts as a fault indicator that illuminates when a fault has been detected, and also reflects the status of the module at any time.

In operation, an optical signal transmitted from first optical channel 32 is received by interconnection module 16a via Rx jack 62a. The optical signal is optically coupled to Tx jack 64b through first WDM 124 and optical tap 126. First WDM 124 separates portions of the incoming optical signal, e.g., and transmits the desired components to optical tap 126. Optical tap deflects a small portion of the optical signal to microcontroller 128 for monitoring, testing and/or other analysis. The remaining portion of the optical signal is transmitted to Tx jack 64b for subsequent optical coupling to the Rx jack (i.e., Rx jack 64a) of a cross-connected interconnection module (i.e., interconnection module 18b).

Microcontroller 128 is capable of continuously monitoring the content and/or strength of the optical signal it receives from optical tap 126 to determine if an appropriate action needs to be performed. Also, because microcontroller 128 is electrically connected via electrical interconnection fabric 72 to system controller 90, electrical information can be transmitted therebetween as needed.

For example, if microcontroller 128 determines that the strength of the optical signal it receives from optical tap 126 is questionable, such information can be sent to system controller 90 for necessary processing. In response thereto, for example, system controller 90 controls transmission of the appropriate optical test signals through optical interconnection fabric 74 and WDMs 142 and 144 to Rx jack 62a and/or Tx jack 62b of the interconnection module that originally sent the information. Such test signals include, e.g., optical time domain reflectometry (OTDR) test signals in accordance with conventional OTDR principles. In this manner, the integrity of first optical channel 32 and jacks 62a, 62b are enabled to be tested continuously and automatically. In one embodiment of the invention, test signals which are sent to the optical channel in question are of a different wavelength, e.g., 1550 nm, than are the typical transmissions over the optical channel, which may have a wavelength, for example, of 1310 nm.

Because microcontroller 128 is an actively intelligent device, it can be configured to include addressable functions. Thus, microcontroller 128 is suitable for transmitting electrical information containing address information identifying the source of the information (i.e., the interconnection module from which the information was transmitted). Also, although an optical signal strength testing operation is described above, it is within the scope of the invention for microcontroller 128 to analyze the content of tapped optical information and to communicate with system controller 90 over the established LAN accordingly. In this manner, microcontroller 128 is capable of incorporating control information, monitoring statistic information and other content-based information initiated by microcontroller into the electrical information transmitted to system controller 90 or other interconnection modules.

The actively intelligent nature of the inventive interconnection modules allows them to be installed within existing non-intelligent distribution frames and to become part of the overall optical communications system. For example, a newly installed interconnection module is capable of transmitting its identity, module type and other characteristic information to system controller 90 and to other interconnection modules within the optical communications system via electrical interconnection fabric 72. Therefore, the overall configuration of the optical communications system is capable of being updated automatically upon installation of an inventive interconnection module therein.

Furthermore, it is within the scope of the invention for the distributed intelligence to cause an interconnection module to shift into a local operating mode or a self diagnostic mode in the event of a network emergency. The results of such actions include, for example, self healing in the form of rerouting the optical connections of the interconnection module in question. Also, continued operation in the event of power failure is possible through local operating modes.

Microcontroller 128 is capable of including therewith other sensing and/or testing equipment, and is capable of incorporating information in addition to that transmitted via Rx jack 62a. For example, microcontroller 128 can include or be replaced by a sensor that determines the temperature and/or quality of the air surrounding interconnection module 16a. Such information can be used in monitoring and/or testing functions. Also, microcontroller 128 is capable of being configured to analyze previous monitoring information and to perform statistical performance monitoring based on such information. In this manner, the interconnection modules are actively performing failure prediction functions instead of passively reacting to an established threshold condition. Other functions adaptable for use by microcontroller 128 in this regard include fiber tracing, protection line switching, monitoring the surrounding environment. All of these functions, as well as those discussed herein previously, are capable of performance in both single mode and multimode optical fiber.

As discussed previously, the characteristically branched electrical and optical interconnection fabrics 72, 74 allow the distribution frames within an optical communications system to be monitored automatically. Also, the distributed intelligence allows most if not all of the monitoring, processing and the like to be performed locally (i.e., at the interconnection modules) through, for example, distributed parallel processing, rather than passively transmitting the information from the interconnection modules to a remotely located system controller.

For example, assuming interconnection module 16a is optically connected to the first optical channel and cross-connected with interconnection module 18b, which is assumed to be optically connected to the second optical channel, the distributed intelligence installed in each interconnection module is used to monitor the operation and maintenance of that optical communication channel. First, several if not all SCMs 92 electrically polls, in real time, the interconnection modules within its respective shelf for any information such as monitoring status. This simultaneous polling epitomizes the distributed or massive parallel processing effort of the invention. Unlike, conventional systems (which use one shared polling device to obtain information serially on a fiber by fiber basis, resulting in non-real-time results and long duty cycles), the distributed intelligence does not require polling type sharing and thus does not affect the responsiveness of the system. Thus, communication systems using massive parallel processing techniques are not limited by the number of optical fiber channels operating therein.

In the event an SCM receives a positive status report from an interconnection module (i.e., a flagged event has occurred at the interconnection module), information concerning the flagged event, the interconnection module originating the flagged event and any control information for responding appropriately to the flagged event is transmitted from the respective SCM to system controller 90. Once the information has been received, appropriate information or test signals can be transmitted from system controller 90 to the interconnection module from which the information was received. Alternatively, information and/or test signals can be transmitted to the interconnection module that is cross-connected to the interconnection module from which the flagged event information was sent. In this manner, the entire optical communications system is monitored simultaneously and tested automatically when necessary or requested.

Figure 5:
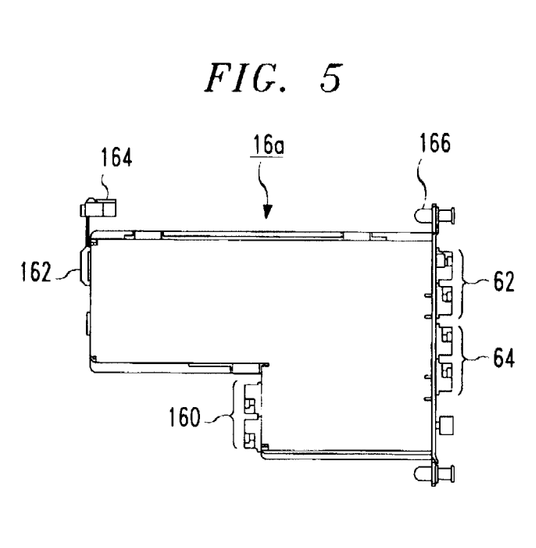
FIG. 5 is a side view illustrating the physical design of one exemplary embodiment of the present invention.
Figure 6:
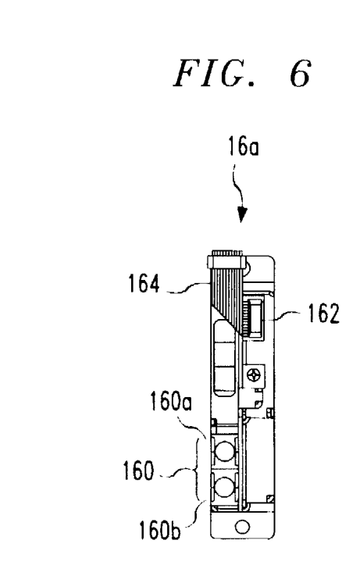
FIG. 6 is a rear view illustrating the physical design of one exemplary embodiment of the present invention.

Referring to FIGS. 4–6, in combination with one another, there are shown perspective, side and rear views, respectively, of one advantageous embodiment illustrating the physical design for the present invention interconnection module 16a. As can be seen, located on a front faceplate 76 of the module, there is included a first jack pair 62 (Rx jack 62a and Tx jack 62b) adapted to receive and interconnect with conventional fiber optic cables, for example, OSP connections. A second jack pair 64 (Rx jack 64a and Tx jack 64b) is also located on the faceplate, for example, for making equipment connections to conventional fiber optic cables. Additionally, the module includes a third jack pair 160 (Rx 160a and Tx 160b) for making test connections, for example, to the optical backplane 74 and for use with an OTDR, as described with respect to FIG. 3. An electrical port 162 is also included for making electrical connections to the electrical backplane 72. As shown, the electrical port 162 is adapted to receive a ribbon connector 164, although it will be understood that any other type of conventional electrical connector may also be used. The interconnection module also includes an LED test button 154 shown at the top of the module which as previously described provides a communication test to the shelf controller. The LED within the test button 154 acts as an indicator for a variety of functions, such as, fiber tracing or patching. Another push-button 156 may be activated in order to place the microcontroller of an individual interconnection module into a self-test diagnostic mode. LED 134 acts as a fault indicator that illuminates when a fault has been detected, and also reflects the status of the module at any time.

The present invention module 16a is preferably dimensioned so that the module fits within the allotted shelf space of an existing fiber optic distribution shelf, where fiber distribution shelves typically come in standard sizes, for example, having heights of five, seven or nine inches. In this way, the modules are easily retrofitted into the shelving of also existing fiber optic distribution frames which is a significant advantage to the present invention. As shown, push pins 166 are included on the faceplate 76 of the module in order to mechanically couple to the shelf of distribution frame.

Figure 7:
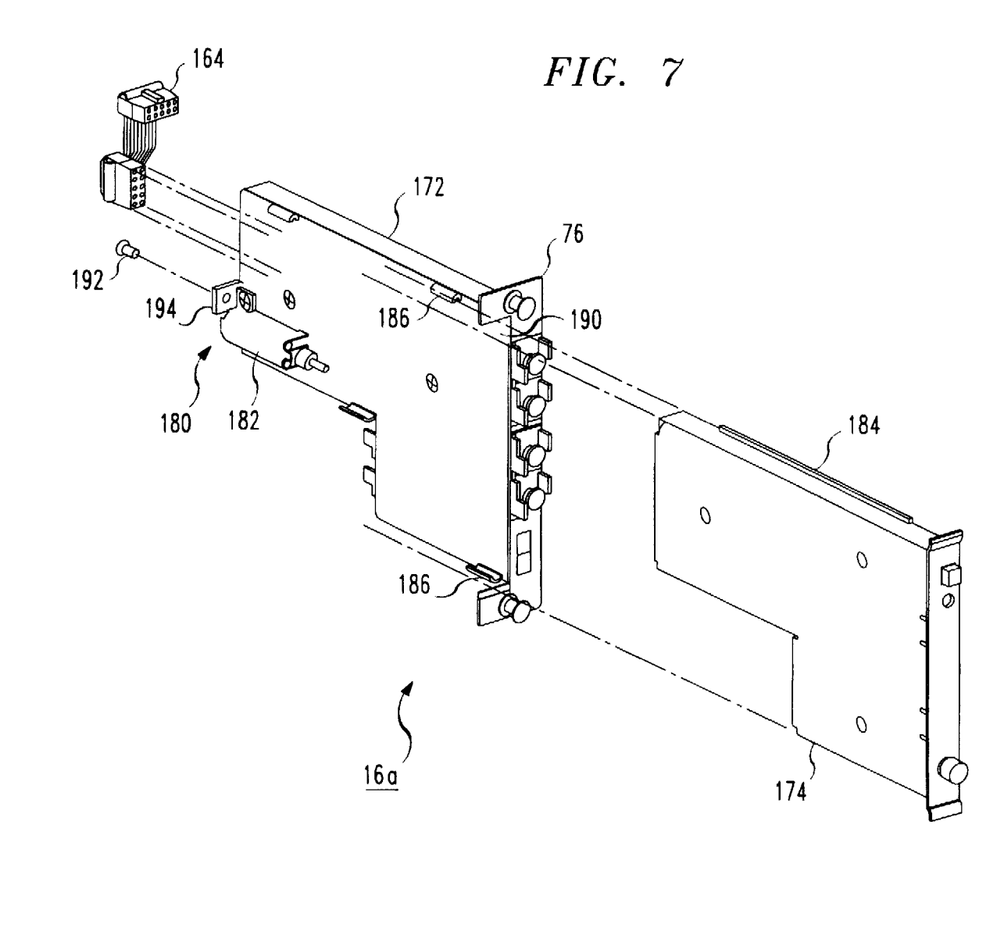
FIG. 7 is another perspective view illustrating the mating arrangement for separate sub-module for one exemplary embodiment of the present invention.

Referring to FIG. 7, the module as illustrated is demonstrative of additional advantageous feature of the present invention. As shown, the module is separable and can be decoupled into two sub-modules, an optical sub-module 172 and an electronic sub-module 174, where each sub-module is partitioned into a separate housing. The optical sub-module 172 includes all of the optical connector inputs and outputs, e.g., the jack pairs, along with the optical tap and WDM devices. The electronics sub-module 174 includes the electronic components, e.g., the microcontroller, used for converting the optical signal into an electronic signal and the electronics for processing and relaying the electronic signal to the backplane and into the LAN.

The two sub-modules are optically coupled to one another by means of a blind mate optical coupler 180, although other known optical coupling devices may also be used. As shown, the optical sub-module includes a male 182 end of the blind mate coupler, while the female end (not shown) is included on the electronics sub-module. As would be understood, the mating arrangement of the coupler, i.e., male and female, could also be reversed for the two sub-modules. Proper mating of the optical coupler and thus the two sub-modules is ensured by rails 184 on the top and bottom of the electronics sub-module which slidably engage corresponding guides 186 on the optical module when the two sub-modules or module halves are mated together. The guides 186 and rails 184 ensure that the male and female ends of the optical coupler 180 will align when the two modules are joined using the shown sliding arrangement. It would also be understood, however, that other well-known guides and mating arrangements any also be used to ensure proper coupling of the two sub-modules.

As shown, the electronics sub-module 174 when mated with the optical sub-module 172 is disposed within an inset 190 on the faceplate 76 of the optical module. Accordingly, when the two sub-modules are mated together the combination appears as a single interconnection module. The two sub-modules are then held in place as a single module by the tightening of a single screw 192 which is fastened through a bracket edge 194 of the optical sub-module 172 which engages the electronics sub-module 174. The two-part combination interconnection module is advantageous in that the optical connector inputs and outputs can be completely decoupled from the electronics and vice versa. Typically a channel failure that is isolated to be within the interconnection module itself will be either part of the optical or the electronics arrangement, but not both. In this way if an interconnection module fails, by way of the present invention, the failure can be easily isolated between the optical and electronic sub-module (for example, by attempting replacement of either sub-module) and only one of either of the two sub-modules will need replacement to remedy the channel failure. As would be understood this is a significant advantage in terms of cost savings for properly maintaining the optical communications network.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. An optical interconnection module, said module comprising:

one or more input ports for optically coupling a transmit and receive section of an optical channel to said module;

one or more output ports for optically coupling a transmit and receive section of another optical channel to said module; and a monitor circuit coupled to said input and output ports for converting a portion of a received optical signal on at least one optical channel to an electronic signal to thereby monitor operation of said at least one optical channel, said module further including:

an optical sub-module housing, said input ports and said output ports being disposed therein; and an electronic sub-module housing, said monitor circuit being disposed therein, said optical sub-module and said electronic sub-module being separate units adapted to mate with one another to thereby form a single said interconnection module.

2. The module of claim 1, further including an optical coupler for coupling said optical sub-module to said electronic sub-module.

3. The module of claim 2, wherein said optical coupler is a blind-mate coupler.

4. The module of claim 1, wherein said optical sub-module and said electronic sub-module include a mechanical alignment arrangement for ensuring proper alignment and coupling between said optical sub-module and said electronic sub-module.

5. The module of claim 4, wherein said mechanical alignment arrangement includes a rail and guide arrangement, whereby said optical and electronic sub-module slidably engage with one another.

6. The module of claim 4, wherein said mechanical alignment arrangement includes a bracket and screw arrangement for mechanical engagement of said optical and electronic sub-module.

7. An optical interconnection module, said module comprising:

one or more input ports for optically coupling a transmit and receive section of an optical channel to said module;

one or more output ports for optically coupling a transmit and receive section of another optical channel to said module; and a monitor circuit coupled to said input and output ports for converting a portion of a received optical signal on at least one optical channel to an electronic signal to thereby monitor operation of said at least one optical channel, wherein said monitor circuit includes a photodetector for converting said optical signal into said electronic signal, further including a microcontroller for monitoring a power level of the converted optical signal, wherein said microcontroller is operable to generate one or more alarm and control signals when said power level reaches a given threshold.

8. An optical interconnection module, said module comprising:

one or more input ports for optically coupling a transmit and receive section of an optical channel to said module;

one or more output ports for optically coupling a transmit and receive section of another optical channel to said module; and a monitor circuit coupled to said input and output ports for converting a portion of a received optical signal on at least one optical channel to an electronic signal to thereby monitor operation of said at least one optical channel, said module, further including one or more test ports for optically coupling an optical test channel to said module and at least one wave division multiplexer (WDM) coupled between said test ports and at least said input ports.

9. An optical interconnection module, said module comprising:

one or more input ports for optically coupling a transmit and receive section of an optical channel to said module;

one or more output ports for optically coupling a transmit and receive section of another optical channel to said module; and a monitor circuit coupled to said input and output ports for converting a portion of a received optical signal on at least one optical channel to an electronic signal to thereby monitor operation of said at least one optical channel, said module, further including at least one optical tap for diverting said portion of said optical signal to said monitor circuit.

10. An optical interconnection module, said module comprising:

one or more input ports for optically coupling a transmit and receive section of an optical channel to said module;

one or more output ports for optically coupling a transmit and receive section of another optical channel to said module; and a monitor circuit coupled to said input and output ports for converting a portion of a received optical signal on at least one optical channel to an electronic signal to thereby monitor operation of said at least one optical channel, said module, wherein said monitor circuit is adapted to couple to an electronic backplane for providing power thereto and for providing communications signals between said module and a control unit.

11. An optical interconnection module, said module comprising:

one or more input ports for optically coupling a transmit and receive section of an optical channel to said module;

one or more output ports for optically coupling a transmit and receive section of another optical channel to said module; and a monitor circuit coupled to said input and output ports for converting a portion of a received optical signal on at least one optical channel to an electronic signal to thereby monitor operation of said at least one optical channel, said module further including one or more test ports for optically coupling an optical test channel to said module, wherein said test ports are adapted to couple to an optical backplane, said optical backplane further coupled to a control unit for generating optical test signals to said module and over an optical channel via said test ports.

12. The module claim 11, wherein said test signals are OTDR test signals.

13. An optical interconnection module, said module comprising:

one or more input ports for optically coupling a transmit and receive section of an optical channel to said module;

one or more output ports for optically coupling a transmit and receive section of another optical channel to said module; and a monitor circuit coupled to said input and output ports for converting a portion of a received optical signal on at least one optical channel to an electronic signal to thereby monitor operation of said at least one optical channel, said module further including a test switch coupled to said monitor circuit and operable to initiate a communication test between said monitor circuit and a controller module coupled thereto.

14. An optical interconnection module, said module comprising:

one or more input ports for optically coupling a transmit and receive section of an optical channel to said module;

one or more output ports for optically coupling a transmit and receive section of another optical channel to said module; and a monitor circuit coupled to said input and output ports for converting a portion of a received optical signal on at least one optical channel to an electronic signal to thereby monitor operation of said at least one optical channel, said module, further including a visual fault indicator for indicating when said power level reaches said given threshold.

15. The module of claim 7, wherein said microcontroller is activatable to be place into a self-test diagnostic mode.

16. An optical interconnection module for use in a fiber optic distribution frame, said module comprising:

an optical sub-module housing, said optical sub module housing including, an input jack pair for optically coupling a transmit and receive section of an optical channel to said module;

an output jack pair for optically coupling a transmit and receive section of another optical channel to said module, and an electronic sub-module housing having a monitor circuit disposed therein, said monitor circuit coupled to at least one jack of either said jack pair, said optical sub-module and said electronic sub-module being separate units adapted to mate with one another to thereby form a single said interconnection module.

17. The module of claim 16, wherein said monitor circuit is operable to convert a portion of a received optical signal on at least one optical channel to an electronic signal to thereby monitor operation of said at least one optical channel.

18. The module of claim 16, wherein said optical sub-module and said electronic sub-module include a mechanical alignment arrangement for ensuring proper alignment and coupling between said optical sub-module and said electronic sub-module.

19. The module of claim 16, further including one or more test ports for optically coupling an optical test channel to said module.

20. The module of claim 17, wherein said monitor circuit includes a photodetector for converting said optical signal into said electronic signal, further including a microcontroller for monitoring a power level of the converted optical signal, wherein said microcontroller is operable to generate one or more alarm and control signals when said power level reaches a given threshold.

21. The module of claim 19, further including at least one wave division multiplexer (WDM) coupled between said test ports and at least said input jack pair.

22. The module of claim 17, further including at least one optical tap for diverting said portion of said optical signal to said monitor circuit.

23. The module of claim 16, wherein said monitor circuit is adapted to couple to an electronic backplane for providing power thereto and for providing communications signals between said module and a control unit.

24. The module of claim 19, wherein said test ports are adapted to couple to an optical backplane, said optical backplane further coupled to a control unit for generating optical test signals to said module and over an optical channel via said test ports.

25. The module of claim 16, wherein said monitor circuit is coupled to a receive section of said input jack pair.

* * * * *